United States Patent
Kim et al.

(10) Patent No.: US 11,713,379 B2
(45) Date of Patent: Aug. 1, 2023

(54) HIGHLY TRANSPARENT OPTICAL FILM

(71) Applicant: TORAY ADVANCED MATERIALS KOREA, INC., Gyeongsangbuk-do (KR)

(72) Inventors: Chang Ju Kim, Gyeongsangbuk-do (KR); Seong Sik Lim, Gyeongsangbuk-do (KR); Gyu Seok Lee, Gyeongsangbuk-do (KR); Sung Heui Hong, Gyeongsangbuk-do (KR)

(73) Assignee: TORAY ADVANCED MATERIALS KOREA, INC., Gyeongsangbuk-do (KR)

( * ) Notice: Subject to any disclaimer, the term of this patent is extended or adjusted under 35 U.S.C. 154(b) by 490 days.

(21) Appl. No.: 16/964,637

(22) PCT Filed: Jan. 7, 2019

(86) PCT No.: PCT/KR2019/000207
§ 371 (c)(1),
(2) Date: Jul. 24, 2020

(87) PCT Pub. No.: WO2019/146931
PCT Pub. Date: Aug. 1, 2019

(65) Prior Publication Data
US 2021/0054156 A1 Feb. 25, 2021

(30) Foreign Application Priority Data
Jan. 24, 2018 (KR) .......................... 10-2018-0008823

(51) Int. Cl.
| | | |
|---|---|---|
| C08J 5/18 | (2006.01) | |
| C08K 3/26 | (2006.01) | |
| C08K 3/30 | (2006.01) | |
| C08L 67/02 | (2006.01) | |

(52) U.S. Cl.
CPC ................... C08J 5/18 (2013.01); C08K 3/26 (2013.01); C08K 3/30 (2013.01); C08L 67/02 (2013.01); *C08J 2367/02* (2013.01); *C08J 2425/06* (2013.01); *C08K 2003/265* (2013.01); *C08K 2003/3045* (2013.01); *C08K 2201/005* (2013.01)

(58) Field of Classification Search
None
See application file for complete search history.

(56) References Cited

U.S. PATENT DOCUMENTS

2011/0080644 A1* 4/2011 Hamamoto .............. G02B 1/14
356/600
2011/0171424 A1* 7/2011 Kliesch .................. B32B 27/36
428/141

FOREIGN PATENT DOCUMENTS

| | | |
|---|---|---|
| CN | 101743268 A | 6/2010 |
| JP | H02-158628 A | 6/1990 |
| JP | H05-043715 A | 2/1993 |
| JP | 2002-258039 A | 9/2002 |
| JP | 2003-183420 A | 7/2003 |
| JP | 2010-530449 A | 9/2010 |
| JP | 2012-188631 A | 10/2012 |
| JP | 2020/074016 * | 5/2020 |
| KR | 10-2006-0067519 A | 6/2006 |
| KR | 10-2007-0100506 A | 10/2007 |
| KR | 10-2010-0020470 A | 2/2010 |
| KR | 10-2011-0034432 A | 4/2011 |
| WO | WO-2017-029995 A1 | 2/2017 |

OTHER PUBLICATIONS

International Search Report from corresponding PCT Application No. PCT/KR2019/000207, dated Apr. 12, 2019.
Office Action from corresponding Japanese Patent Application No. 2020-540441, dated Aug. 31, 2021.
Office Action & Search Report from corresponding Chinese Patent Application No. 201980010040.5, dated Jun. 15, 2022.

* cited by examiner

*Primary Examiner* — Robert T Butcher
(74) *Attorney, Agent, or Firm* — Harness, Dickey & Pierce, P.L.C.

(57) ABSTRACT

The present invention is suitable for optical applications with excellent transparency through a haze value of 1.5% or lower and particles that are hardly visible to the naked eye, by producing a film using particles having little difference in refractive index in polyethylene terephthalate (PET), which is a commonly-used polyester film, and can provide a highly transparent optical film capable of improving a winding property by forming surface roughness of 4 nm or higher.

4 Claims, 1 Drawing Sheet

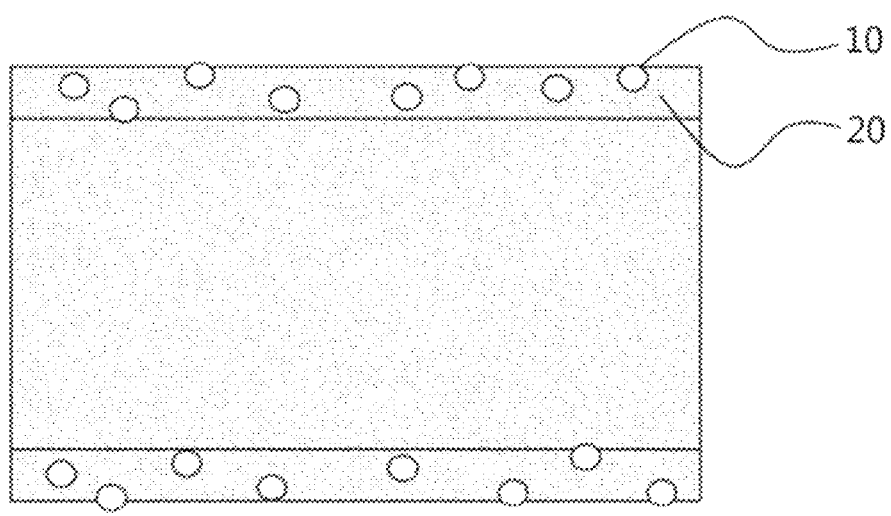

HIGHLY TRANSPARENT OPTICAL FILM

CROSS-REFERENCE TO RELATED APPLICATIONS

This application is a national phase application of PCT Application No. PCT/KR2019/000207, filed on Jan. 7, 2019, which claims the benefit and priority to Korean Patent Application No. 10-2018-0008823, filed on Jan. 24, 2018. The entire disclosures of the applications identified in this paragraph are incorporated herein by references.

FIELD

The present invention relates to a highly transparent optical film, and more particularly, to a highly transparent optical film that exhibits excellent transparency with low haze and particles of low visible graininess to the naked eye, as well as an excellent winding property, and a stable particle shape even after film preparation.

BACKGROUND

Conventionally, polyethylene terephthalate (PET), which is a general-purpose polymer, is commonly used as a polyester film used for liquid crystal displays, and has been applied to various uses such as a reflector, a diffuser, a prism sheet, and so on.

Although these PET films have good overall physical properties such as heat resistance, weather resistance, transparency, and the like, and are convenient to process, there is a disadvantage in that when a film is prepared with a single PET material, there is no roughness to thereby cause deterioration of runnability thereof, resulting in a difficulty in winding.

Thus, the problem in winding was conventionally solved by adding particles to PET or to the coating solution on PET to form roughness thereon; however, there existed a potential concern of leading to lower transparency of a product due to the visibility of particles in an optical film that requires high transparency.

Therefore, as a result of efforts made to resolve the problems of the polyester film used for conventional liquid crystal displays, the present inventors have enhanced the winding property and transparency at the same time with a design of reducing the difference in refractive index between the film and the particle component, thereby completing the present invention.

SUMMARY

Technical Objects

The present invention is devised to solve the problems as described above, and it is an object of the present invention to provide a highly transparent optical film that exhibits excellent transparency as well as an excellent winding property, and a stable particle shape even after film preparation.

The above and other objects and advantages of the present invention will become more apparent from the following description of the preferred embodiments.

Technical Solution

The above object is achieved by a highly transparent optical film containing particles, wherein a difference in refractive index between the particles and a film substrate component is 0.1 or lower, and a ratio of major/minor diameters of the particles is 1.0 to 1.5 or lower.

Here, the film substrate component is a polyethylene terephthalate resin.

Preferably, the particles are at least one of barium sulfate ($BaSO_4$), calcium carbonate ($CaCO_3$), and polystyrene.

Preferably, the particles have a major diameter of 0.5 μm to 3 μm.

Preferably, the content of the particles is 0.0005 to 0.005% by weight, based on the total weight of a resin composition.

Preferably, the film has a two-dimensional surface roughness (Ra) value of 4 nm or higher, and a haze value of 1.5% or lower.

Effects of the Invention

The prevent invention has an effect of achieving various physical properties of the films used for liquid crystal displays with excellent transparency through low haze and particles of low visible graininess to the naked eye, as well as an effect of having an excellent winding property through the formation of roughness, and so on.

Furthermore, the present invention provides an effect of having a stable particle shape even after film preparation, and so on.

However, the effects of the present invention are not limited to the those mentioned above, and further effects that have not mentioned above will be clearly understood by those having ordinary skill in the art from the following description.

BRIEF DESCRIPTION OF THE DRAWINGS

The figure is a schematic cross-sectional view of a highly transparent optical film in accordance with a preferred embodiment of the present invention.

DETAILED DESCRIPTION

Hereinafter, the present invention will be described in detail with reference to the embodiments and drawings of the present invention. It will be apparent to those having ordinary skill in the art that these embodiments are merely presented by way of example to describe the present invention in greater detail, and the scope of the present invention is not limited by such embodiments.

Unless defined otherwise, all technical and scientific terms used herein have the same meaning as commonly understood by those having ordinary skill in the art to which the present invention pertains. In case of conflict, the present specification that includes definitions of terms shall prevail. In addition, although other methods and materials similar or equivalent to those described herein may be used in implementation or testing of the present invention, suitable methods and materials are described herein.

In describing and/or claiming the present invention, the term "copolymer" is used to refer to a polymer formed by copolymerization of two or more monomers. Such copolymers include copolymers, terpolymers, or higher order copolymers.

A highly transparent optical film in accordance with an aspect of the present invention is a highly transparent optical film containing particles, where the difference in refractive index between the particles and a film substrate component may be 0.1 or lower, and the ratio of major/minor diameters of the particles may be 1.0 to 1.5 or lower. This is because if the ratio of major/minor diameters of the particles exceeds 1.5 in this case, the roughness to be achieved in the present invention cannot be secured.

Here, the ratio of major/minor diameters (hereinafter, referred to as an aspect ratio) is determined by observation using an electron microscope. The largest diameter of a particle is considered as the major diameter, and the largest diameter in the direction orthogonal to that largest diameter is considered as the minor diameter. Specifically, a produced film is sectioned at the top thereof (cross section toming), an electron scanning microscope (S-4800) from Hitachi Ltd., Japan, is used to capture photographs at a magnification of 5000×, major and minor diameters are measured for 10 particles, and data are obtained with the average of the major/minor diameters.

The present invention will be described in detail through a method for manufacturing a highly transparent optical film in accordance with another aspect of the present invention.

A method for manufacturing a film in accordance with the present invention may comprise five (5) steps as follows:

1) Step 1 of manufacturing an unstretched sheet by melt-extruding a raw material composition containing a polyester resin as a main component, followed by forming it into a sheet shape.

2) Step 2 of cooling the unstretched sheet in a casting drum.

3) Step 3 of uniaxially stretching the cooled sheet.

4) Step 4 of biaxially stretching the film that has been uniaxially stretched.

5) Step 5 of heat-treating the biaxially stretched film.

Step 1 is a step of manufacturing an unstretched sheet by melt-extruding a raw material composition containing a polyester resin as a main component, followed by forming it into a sheet shape.

In one embodiment, the polyester resin used as the base resin of the polyester film may comprise a dicarboxylic acid component and a diol component; for the dicarboxylic acid component, it may be preferred to use terephthalic acid, triphenylamine dicarboxylic acid, isophthalic acid, 2,6-naphthalenedicarboxylic acid, 2,7-anthracenedicarboxylic acid, 2,7-pyrenedicarboxylic acid, 4,4'-diphenyldicarboxylic acid, adipic acid, or sebacic acid; and the diol component may be selected to use from ethylene glycol, 1,4-butanediol, 1,4-cyclohexanedimethanol, 1,6-hexanediol, and the like.

Further, if polyethylene terephthalate is used as the base resin for the film substrate component, it may be desirable from the viewpoint of film preparation stability to use a copolymerized polyester containing preferably 1 to 15 mol %, more preferably 3 to 14 mol %, and most preferably 5 to 13 mol % of a copolymerization component based on the total dicarboxylic acid component, or to use a copolymerized polyester containing preferably 1 to 15 mol %, more preferably 3 to 14 mol %, and most preferably 5 to 13 mol % of a copolymerization component based on the total diol component. In this case, if the copolymerization component is less than 1 mol %, it is difficult to prepare a film having good physical properties, whereas if over 15 mol %, there is also difficulty in preparing a film. In addition, the dicarboxylic acid component as the copolymerization component may be selected to use from the group consisting of isophthalic acid, 2,6-naphthalenedicarboxylic acid, 4,4'-diphenyldicarboxylic acid, adipic acid, and sebacic acid, and the diol component may be selected to use from ethylene glycol, 1,4-butanediol, 1,4-cyclohexanedimethanol, 1,6-hexanediol, and the like. Moreover, it is preferable to use isophthalic acid or 2,6-naphthalenedicarboxylic acid out of the copolymerization components to obtain a good film preparation property, and it is preferable to use 1,4-cyclohexanedimethanol, which has the effect of stabilizing the dispersion state of immiscible resins. The copolymer in accordance with an embodiment obtained by this method is preferred to meet a glass transition temperature of 80 to 150° C. This is because, in this case, if the glass transition temperature is less than 80° C., the copolymer is not suitable for use in display applications which heats up to 60° C. or higher, and if the glass transition temperature exceeds 150° C., it is difficult to prepare a film due to the stretching load.

Furthermore, various additives, for example, fluorescent brighteners, crosslinking agents, heat stabilizers, antioxidant stabilizers, ultraviolet absorbers, organic lubricants, inorganic fine particles, fillers, light-resistant agents, antistatic agents, nucleating agents, dyes, dispersants, coupling agents, and the like may be added to the raw material composition, within a range that does not impair the effects of the present invention.

In addition, particles (10) having compatibility with the polyester resin (20) are used in the raw material composition. In this case, it is preferable to use at least one of barium sulfate, calcium carbonate, and polystyrene as the particles in the present invention. In other words, these may be used alone or in combinations of two or more kinds.

Moreover, the content of the particles is preferably 0.0005 to 0.005% by weight relative to the total weight of the resin composition, and more preferably, 0.001 to 0.002% by weight is used. This is because, in this case, if the content is less than 0.0005% by weight, there is a disadvantage in that the error in measurement becomes larger due to too little amount, and the formation of roughness is insufficient, which in turn leads to an insignificant effect of improving the winding property, and if the content exceeds 0.005% by weight, the agglomeration of particles resulting from an excessive addition is recognized as a defect in the film, which leads to higher haze and easier visibility of particles to the naked eye, thereby causing the film to be unsuitable to be used as an optical film.

In addition, it is preferable that the particles have a major diameter of 0.5 µm to 3 µm, and this is because if the major diameter is less than 0.5 µm, the formation of roughness is insufficient, which hardly secures an excellent winding property, and if over 3 µm, there is a possibility of being recognized as a defect in the film.

Furthermore, it is preferable that the difference in refractive index between the particles and the film substrate component is 0.1 or lower, and that the aspect ratio (ratio of major/minor diameters) of the particles is 1.0 to 1.5 or lower.

The unstretched sheet produced in Step 1 may be a single layer or a multilayer of two or more layers.

Next, Step 2 is a step of cooling the unstretched sheet, which has been formed in Step 1, in the casting drum. Since this step is widely known to those having ordinary skill in the art, the detailed description thereof will not be set forth here.

Next, Step 3 is a step of producing a uniaxially stretched film by uniaxially stretching the cooled unstretched sheet, and is a step of heating the cooled unstretched sheet by a heating means such as roll heating or infrared heating (heater) and of stretching it first in the longitudinal direction, to thereby obtain a uniaxially stretched film. Stretching is preferably carried out utilizing the difference in peripheral speed of two or more rolls, the stretching temperature is set to a temperature equal to or higher than the glass transition temperature (Tg) of the polyester resin, and the stretch ratio is preferably 3.0 to 5.0 times. If the stretch ratio is less than 3.0 times, the required optical properties cannot be obtained sufficiently, and if it is greater than 5.0 times, the film preparation stability becomes disadvantageous.

Next, Step 4 is a step of producing a biaxially stretched film by biaxially stretching the uniaxially stretched film, and is a step of biaxially stretching the film, which has been uniaxially stretched in the longitudinal direction in Step 3, continuously in both the longitudinal direction and a direction perpendicular thereto (hereinafter, also referred to as a "width direction"). At this time, the stretching in the width direction starts at a temperature higher than the glass transition point (Tg) of the polyester resin, and is performed while raising the temperature above the glass transition point (Tg) by 5 to 70° C. The temperature rise during the stretching process in the width direction may be continuous or stepwise (sequential), but is usually performed sequentially. For example, the stretching zone in the width direction of a tenter is divided into a plurality along the film running direction, and the temperature is raised by flowing a heating medium of a predetermined temperature for each zone.

Next, Step 5 is a step of heat-treating the biaxially stretched film, and is for producing a biaxially oriented film by sequentially performing heat treatment such as heat-setting, thermal relaxation, or the like while running the biaxially stretched film. Hence, in order to complete the crystal orientation of the obtained biaxially stretched film to thereby impart planarity and dimensional stability, heat treatment is continuously performed in the tenter at a temperature of 150 to 250° C. for 1 to 30 seconds. If the heat treatment temperature is lower than 150° C., the crystal orientation is incomplete, which in turn adversely affects the strength and elongation of the film, and if higher than 250° C., it is difficult to achieve desired full transparency due to over-crystallization. After the heat treatment, by uniformly and slowly cooling the film down to room temperature, followed by winding it, a highly transparent optical film in accordance with the present invention can be obtained. At this time, a relaxation treatment of 3 to 12% may be performed in the width direction or the longitudinal direction as necessary during the heat treatment process.

The highly transparent optical film produced by the manufacturing method described above preferably has a two-dimensional surface roughness (Ra) of 4 nm or higher, and a haze value of 1.5% or lower.

Hereinafter, the construction of the present invention and the effects thereof will be described in greater detail through embodiments and comparative examples. However, these embodiments are intended to illustrate the present invention more specifically, and the scope of the present invention is not limited thereto.

Embodiment 1

Barium sulfate particles (AB-TM Series from Huntsman Co.,) having an average particle diameter of 2 μm was added in 0.001% by weight to the 99.999% by weight of the polyester resin, and this mixture was fed to an extruder heated to 280° C. and formed into a sheet of three layers of ABA having a layer thickness ratio of 1:10:1 in a die.

The formed sheet was cooled and solidified in a casting drum having a surface temperature of 20° C. so as to obtain an unstretched film, which was heated, stretched by 3.5 times in the longitudinal direction, and then cooled. Subsequently, while holding both ends of the film that has been uniaxially stretched in the longitudinal direction with clips, the film was guided to a tenter and stretched by 3.5 times in a direction perpendicular (width direction) to the length in a heated atmosphere.

Thereafter, the film was subjected to heat-setting in the tenter and cooled down to room temperature to obtain a biaxially stretched film. The thickness of the film obtained at this time was 100 μm. The physical properties of the film obtained as above are presented in Table 1 below.

Embodiment 2

Except that the average diameter of the particles in the raw material composition was 0.5 μm during the film preparation in Embodiment 1, a film was prepared in the same manner as in Embodiment 1.

Embodiment 3

Except that the average diameter of the particles in the raw material composition was 3 μm during the film preparation in Embodiment 1, a film was prepared in the same manner as in Embodiment 1.

Embodiment 4

Except that the content of the particles in the raw material composition was 0.0005% by weight during the film preparation in Embodiment 1, a film was prepared in the same manner as in Embodiment 1.

Embodiment 5

Except that the content of the particles in the raw material composition was 0.005% by weight during the film preparation in Embodiment 1, a film was prepared in the same manner as in Embodiment 1.

Embodiment 6

Except that the particles in the raw material composition were calcium carbonate (MX Series from Maruo Calcium Co.) during the film preparation in Embodiment 1, a film was prepared in the same manner as in Embodiment 1.

Embodiment 7

Except that the particles in the raw material composition were polystyrene (IX3HEHE Series from Nippon Shokubai Co.) during the film preparation in Embodiment 1, a film was prepared in the same manner as in Embodiment 1.

Comparative Example 1

Except that the particles in the raw material composition were silica (K Series from Grace) during the film preparation in Embodiment 1, a film was prepared in the same manner as in Embodiment 1.

Comparative Example 2

Except that the average diameter of the particles in the raw material composition was 0.2 μm during the film preparation in Embodiment 1, a film was prepared in the same manner as in Embodiment 1.

Comparative Example 3

Except that the average diameter of the particles in the raw material composition was 5.0 μm during the film preparation in Embodiment 1, a film was prepared in the same manner as in Embodiment 1.

Comparative Example 4

Except that the content of the particles in the raw material composition was 0.0002% by weight during the film preparation in Embodiment 1, a film was prepared in the same manner as in Embodiment 1.

Comparative Example 5

Except that the content of the particles in the raw material composition was 0.01% by weight during the film preparation in Embodiment 1, a film was prepared in the same manner as in Embodiment 1.

Comparative Example 6

Except that the particles in the raw material composition were polymethylmethacrylate (MX Series from Nippon Shokubai Co.) during the film preparation in Embodiment 1, a film was prepared in the same manner as in Embodiment 1.

The highly transparent optical films in accordance with Embodiments 1 to 7 and Comparative Examples 1 to 6 described above were used to measure physical properties through the following experimental examples, and the results are shown in Table 1 below.

EXPERIMENTAL EXAMPLES

1. Haze Measurement

For the films produced in Embodiments 1 to 7 and Comparative Examples 1 to 6, the samples were placed vertically on an automatic digital hazemeter (COH400) from Nippon Denshoku Co., and a beam of light having a wavelength of 0 nm to 700 nm was transmitted through the vertically placed samples in a direction perpendicular thereto, to measure the resulting values.

2. Measurement of Two-Dimensional (2D) Surface Roughness (Ra)

The films produced in Embodiments 1 to 7 and Comparative Examples 1 to 6 were measured at a cut-off of 0.25 mm with a surface roughness meter (SE3300) from Kosaka Co., Japan.

3. Measurement of Aspect Ratio

The films produced in Embodiments 1 to 7 and Comparative Examples 1 to 6 were sectioned at the top thereof (cross section toming), an electron scanning microscope (S-4800) from Hitachi Ltd., Japan was used to capture photographs at a magnification of 5000×, major and minor diameters were measured for 10 particles, and data were obtained with the average of the major/minor diameters.

4. Visual Inspection (Graininess)

The films produced in Embodiments 1 to 7 and Comparative Examples 1 to 6 were inspected by transmitting light from a three-wavelength light source, and marked as "O" if no particles or defects were visible, "Δ" if some are visible, and "X" if particles are easily visible.

5. Evaluation of Winding Property

The films produced in Embodiments 1 to 7 and Comparative Examples 1 to 6 were manufactured 30 tons or more, and marked as "O" if there was no cross-sectional defect and "X" if there was a cross-sectional defect when winding at a slitter.

TABLE 1

| | Resin Composition | | | | | | Physical Properties | | | | |
| | Substrate | | | Particle | | | | | | | |
| Category | Material | Refractive Index | wt % | Kind | Refractive Index | Diameter (μm) | wt % | Haze (%) | 2D Surface Roughness | Aspect Ratio | Visual Inspection | Winding Property |
|---|---|---|---|---|---|---|---|---|---|---|---|---|
| Embodiment 1 | PET | 1.65 | 99.999 | BaSO$_4$ | 1.64 | 2.0 | 0.001 | 0.8 | 5 | 1.1 | O | O |
| Embodiment 2 | PET | 1.65 | 99.999 | BaSO$_4$ | 1.64 | 0.5 | 0.001 | 0.6 | 4 | 1.1 | O | O |
| Embodiment 3 | PET | 1.65 | 99.999 | BaSO$_4$ | 1.64 | 3.0 | 0.001 | 0.9 | 5 | 1.1 | O | O |
| Embodiment 4 | PET | 1.65 | 99.9995 | BaSO$_4$ | 1.64 | 2.0 | 0.0005 | 0.6 | 4 | 1.1 | O | O |
| Embodiment 5 | PET | 1.65 | 99.995 | BaSO$_4$ | 1.64 | 2.0 | 0.005 | 1.3 | 7 | 1.1 | O | O |
| Embodiment 6 | PET | 1.65 | 99.999 | CaCO$_3$ | 1.59 | 2.0 | 0.001 | 0.8 | 5 | 1.1 | O | O |
| Embodiment 7 | PET | 1.65 | 99.999 | Polystyrene | 1.60 | 2.0 | 0.001 | 0.9 | 4 | 1.3 | O | O |
| Comparative Example 1 | PET | 1.65 | 99.999 | SiO$_2$ | 1.40 | 2.0 | 0.001 | 1.1 | 5 | 1.0 | X | O |
| Comparative Example 2 | PET | 1.65 | 99.999 | BaSO$_4$ | 1.64 | 0.2 | 0.001 | 0.5 | 2 | 1.1 | O | X |
| Comparative Example 3 | PET | 1.65 | 99.999 | BaSO$_4$ | 1.64 | 5.0 | 0.001 | 1.3 | 9 | 1.1 | X | O |
| Comparative Example 4 | PET | 1.65 | 99.9998 | BaSO$_4$ | 1.64 | 2.0 | 0.0002 | 0.5 | 3 | 1.1 | O | X |
| Comparative Example 5 | PET | 1.65 | 99.99 | BaSO$_4$ | 1.64 | 2.0 | 0.01 | 1.7 | 8 | 1.1 | X | O |
| Comparative Example 6 | PET | 1.65 | 99.999 | PMMA | 1.49 | 2.0 | 0.001 | 1.1 | 2 | 2.1 | Δ | X |

As can be seen from Table 1, good results were confirmed in that the highly transparent optical films in accordance with Embodiments 1 to 7 of the present invention had a haze value of 1.5% or lower, a two-dimensional surface roughness (Ra) value of 4 nm or higher, and a stable particle shape even after film preparation with an aspect ratio level of 1.1, the graininess of particles was not easily visible at the visual inspection, and winding problems did not occur during the film preparation.

In contrast, the highly transparent optical film in accordance with Comparative Example 1 achieved various physical properties but particles were visible at the visual inspection due to the difference in refractive index, and the highly transparent optical film in accordance with Comparative Example 2 used too small particles, which led to a poor winding property. The highly transparent optical film in accordance with Comparative Example 3 used too large particles, causing them to be visible as a defect of the film at the visual inspection, and the content of particles in the highly transparent optical film in accordance with Comparative Example 4 was too low, which led to lower roughness and thus a poor winding property. The highly transparent optical film in accordance with Comparative Example 5 resulted in an elevated haze level and graininess visibility due to the addition of an excessive quantity of particles. Finally, for the highly transparent optical film in accordance with Comparative Example 6, the aspect ratio of the internal particles measured after film preparation was 2.1, which led to lower roughness and thus a poor winding property, and particles were visible at the visual inspection due to the difference in refractive index.

Therefore, the highly transparent optical film in accordance with the present invention can be advantageously used as a diffusion sheet of a backlight device for image display, a prism sheet, a hard coating sheet for mobile devices, and the like.

Furthermore, the present specification has described mainly the highly transparent optical film, but also the highly transparent optical film in accordance with the present invention can be advantageously used as a sheet for the safety of car windows or general windows.

Although the present specification has described only a few examples out of various embodiments performed by the present inventors, the spirit of the present invention is not limited or confined thereto, and can also be variously implemented by those having ordinary skill in the art.

What is claimed is:

1. A highly transparent optical film containing particles, wherein a difference in refractive index between the particles and a film substrate component is 0.1 or lower, and
a ratio of major/minor diameters of the particles is 1.0 to 1.5,
wherein the film substrate component is a polyethylene terephthalate resin,
wherein the particles have a major diameter to 0.5 to 3μm, and
wherein the film has a two-dimensional surface roughness (Ra) of 4 to 7 nm, wherein the content of the particles is 0.0005 to 0.005% by weight, based on the total weight of a resin composition.

2. The highly transparent optical film of claim 1, wherein the particles are at least one of barium sulfate ($BaSO_4$), calcium carbonate ($CaCO_3$), and polystyrene.

3. The highly transparent optical film of claim 1, wherein the film has a haze value of 1.5% or lower.

4. The highly transparent optical film of claim 2, wherein the film has a haze value of 1.5% or lower.

* * * * *